United States Patent [19]

Buthe et al.

[11] Patent Number: 4,639,163

[45] Date of Patent: Jan. 27, 1987

[54] DRIVELINE COUPLING WITH SAFETY INTERLOCK MECHANISM

[75] Inventors: Theo Buthe; Hubert Geisthoff, both of Lohmar; Horst Kretschmer, Cologne; Felix Mikeska, Siegburg; Alexander Post, Neunkirchen, all of Fed. Rep. of Germany

[73] Assignee: Jean Walterscheid GmbH, Lohmar, Fed. Rep. of Germany

[21] Appl. No.: 678,638

[22] Filed: Dec. 6, 1984

[30] Foreign Application Priority Data

Dec. 17, 1983 [DE] Fed. Rep. of Germany ....... 3345732

[51] Int. Cl.$^4$ ............................................. F16B 7/00
[52] U.S. Cl. .................................. 403/322; 403/328; 403/359; 403/316; 403/372
[58] Field of Search ............... 403/321, 328, 322, 359, 403/325, 316, 317, 318, 12, 17, 13, 372, 326, 327; 285/316, 277

[56] References Cited

U.S. PATENT DOCUMENTS

| 3,260,541 | 7/1966 | Sadler et al. | 403/325 |
| 3,747,966 | 7/1973 | Wilkes et al. | 403/322 |
| 4,289,414 | 9/1981 | Recker | 403/325 X |
| 4,402,626 | 9/1983 | Recker | 403/317 |
| 4,431,334 | 2/1984 | Cleveland et al. | 403/322 |
| 4,453,449 | 6/1984 | Hollmann | 285/316 X |
| 4,464,077 | 8/1984 | Herchenbach et al. | 403/325 X |
| 4,523,871 | 6/1985 | Recker | 403/322 X |
| 4,579,476 | 4/1986 | Post | 403/322 |

FOREIGN PATENT DOCUMENTS

204379 5/1966 Sweden ..................... 285/277

Primary Examiner—Cornelius J. Husar
Assistant Examiner—Joseph A. Fischetti
Attorney, Agent, or Firm—Toren, McGeady and Goldberg

[57] ABSTRACT

A drive shaft having an annular groove is placed in driving connection with a coupling sleeve by engagement members which constitute spherical balls radially movable within apertures in the coupling sleeve for engagement within the annular groove of the drive shaft. A locking ring engaging around the engagement members holds them in the locked position within the annular groove and when the mechanism is in the unlocked position, the locking ring is held axially away from the locked position by a latching member which engages within the apertures of the coupling sleeve to hold the locking ring in the unlocked position against the biasing force of a spring. A guide ring affixed to the coupling sleeve guides the locking ring by means of a gripping sleeve affixed thereto for movement relative to the coupling sleeve axially and nonrotatively with the guide ring including apertures through which the latching member engages when it is moved between the latched and the unlatched positions.

12 Claims, 24 Drawing Figures

DRIVELINE COUPLING WITH SAFETY INTERLOCK MECHANISM

The present invention relates generally to driveline coupling mechanisms and more particularly to a coupling mechanism useful in agricultural equipment for connecting, for example, the drive shaft of an agricultural implement with a power takeoff shaft of a tractor.

Coupling mechanisms of the type to which the present invention relates generally include engagement members which are guided in radial apertures of the coupling sleeve within which the drive shaft is inserted for torque transmitting engagement, with the drive shaft and the coupling sleeve being held in an axially locked position by the engagement members which may constitute spherical balls which may be held in the locking position by a locking ring circumferentially engaging the balls to hold them radially inwardly in engagement with the annular groove in the drive shaft. The locking ring is usually spring biased toward the locking position by a spring and when the drive shaft is to be inserted into engagement with the coupling sleeve, it is important that the locking ring not be in a position to prevent the engagement members from moving radially outwardly so as to enable insertion of the drive shaft into the coupling sleeve.

Accordingly, it is important to ensure that when the coupling sleeve and the drive shaft are unattached, the locking ring is held in the unlocking position so as not to impede engagement of the coupling mechanism.

A coupling device of the type to which the present invention relates is known in the prior art in U.S. Pat. No. 3,747,966, wherein the locking ring is held in the open position by a push button which radially embraces the gripping sleeve connected with the locking ring and by means of which a blocking ring is taken out of its central position and placed eccentrically into a circumferential groove. At the same time, provision is made for the blocking ring and a bracket, which, in the blocked position and in conjunction with the groove, maintains the open arrested position, to be movable into one of six equally circumferentially distributed bores arranged in the area of the groove so that the coupling sleeve may be turned via the gripping sleeve.

The disadvantage of a prior art arrangement of the type described is that there are only six engaging positions which permit a nonrotating connection between the gripping sleeve and the coupling sleeve and that these engaging positions must be sought when they are required.

A further disadvantage of a locking mechanism of the type described is that the bores are arranged in the direct vicinity of the radial apertures of the coupling sleeve receiving the engagement member, as a result of which, the coupling sleeve area, which under operating conditions is subject to high axial loads, is weakened.

A particular disadvantage of a mechanism according to the prior art is that a number of functionally important design features are arranged at the coupling sleeve. This means that expensive machining operations are necessary on the coupling sleeve which, because of the interaction with the components attached, requires close tolerances. In view of this requirement, the entire locking mechanism becomes very expensive and, in particular, not suited for subsequent attachment to a coupling sleeve which was originally not intended for use therewith.

Accordingly, the present invention is directed towards providing an interlocking coupling mechanism with a locking ring which may be maintained in the open position in the case of which all functionally important features are combined in a complete unit and wherein the coupling sleeve is provided with positioning elements cooperating with one single locking component only and wherein it is ensured that in the arrested open position, the coupling sleeve is nonrotatively connected to the gripping part of the locking ring, but with the outer gripping part in the locked position being rotatable relative to the coupling sleeve.

SUMMARY OF THE INVENTION

Briefly, the present invention may be described as a driveline coupling mechanism having a safety interlock device particularly suitable for connecting the drive shaft of an agricultural implement with the power takeoff shaft of a tractor comprising: a coupling sleeve having radial apertures therein; a drive shaft adapted to be held in torque transmitting engagement with the coupling sleeve and having an annular groove formed therein; engagement members radially movable within the radial apertures for engagement within the annular groove to axially hold the coupling sleeve and the drive shaft together; a locking ring member axially movable on the coupling sleeve between a locking position and an unlocking position, the locking ring member operating to lock the engagement members in engagement within the annular groove when in the locking position and to permit the engagement members to move radially outwardly for disengagement from the annular groove when in the unlocking position; spring means axially biasing the locking ring member toward the locking position; latching means engaging within the radial apertures in a latched position for holding the locking ring member in the unlocking position, the latching means being engageable by the engagement members and being brought to an unlatched position to permit the locking ring member to move to the locking position when the drive shaft is inserted into the coupling sleeve; and a guide ring affixed to the coupling sleeve and including first guide means interposed between the guide ring and the locking ring member for enabling relative axial movement between the locking ring member and the coupling sleeve while preventing relative rotative movement therebetween in the unlocking position of the locking ring member and second guide means through which the latching means extend for movement between the latched and the unlatched position.

The first guide means may comprise splines or axially extending teeth which are formed on the locking ring member to extend an axial distance so that when the locking ring member is in the locked position holding the balls radially into engagement within the annular groove, the locking ring member may be rotated about the coupling sleeve.

In accordance with certain more specifics aspects of the invention, the guide ring is formed as a flange-like member which is provided with axially extending apertures and which is held on the coupling sleeve so as to be nonrotative and axially immovable relative thereto.

The locking ring member includes a locking ring which has connected therewith a gripping sleeve which extends axially therefrom and the spring means may be interposed between a radially extending part of the gripping sleeve and the guide ring.

The latching means may be comprised of a latching ring having latching hooks thereon and a supporting bracket with the latching ring passing through the apertures in the guide ring and with the supporting brackets resting axially against the locking ring of the locking ring member with the latching hooks thereof extending in the same direction as the supporting brackets and being guided on the coupling sleeve so as to be axially movable thereon.

The locking ring by means of the gripping sleeve which is provided at both ends with annular, radially inwardly extending projections, is loaded in the direction of the locked position by the spring whose end facing away from the locking ring of the base or guide ring is supported and whose other end acts on the gripping sleeve in the slipping-on direction of the coupling sleeve.

The cylindrical inner face of the gripping sleeve is provided with a projection which, in the open position, enters into operative connection with the basic or guide ring.

The advantage of the locking mechanism in accordance with the invention involves the fact that it forms a complete assembly with the coupling sleeve being provided with positioning bores for the base or guide ring only.

As a result of this design, it is quite easy subsequently to attach the locking mechanism in the open position to a coupling sleeve with which it was not originally intended for use.

A further advantage is that the gripping sleeve of the locking ring member extends to cover the outside of the locking mechanism and is guided at both axial ends spaced far apart so that any tilting of the gripping sleeve during operation is avoided.

Because of the interaction of the gripping sleeve projection and the guide ring in the open position, the coupling sleeve cannot turn when being slipped onto the power takeoff shaft.

In accordance with further essential features of the invention, the outer circumference of the base or guide ring is provided with teeth and the projection of the gripping sleeve is provided with corresponding teeth and both sets of teeth at the ends facing each other are pointed and both sets of teeth in the open position of the pulling lock or locking mechanism enter into operative connection with each other thereby to provide the first guide means of the invention.

By providing claw-like teeth pointed in the direction of action, it is ensured that in the open position, the gripping sleeve of the pulling lock or locking mechanism is positively connected and held nonrotatively relative to the guide ring and thereby relative to the coupling sleeve.

This makes it possible to turn the coupling sleeve when slipping it on the power takeoff shaft of the tractor even if an agricultural implement which is difficult to turn is connected because the teeth are in a position to accommodate eve higher torques in the circumferential direction.

In the case of the design in accordance with the invention, there is no need for a complicated search for a nonrotating connection in the restricted space between the tractor and the implement attached.

According to a further embodiment of the invention, the basic or guide ring, for the purpose of guiding the latching ring, has been provided with a hollow cylindrical projection pointing in the slipping-on direction of the coupling sleeve.

Because of the guiding length of the guide ring on the coupling sleeve achieved by this design, it is sufficient to provide the coupling sleeve with one single positioning bore which cooperates with the projection on the guide ring.

In a further advantageous embodiment of the invention, the latching ring passes through the annular gripping sleeve projections facing the slipping-on direction of the coupling sleeve, with the part of the latching ring projecting from the gripping sleeve being provided with a radially outwardly pointing flange and the guide ring being provided with at least one projection designed as a radial stop for the latching ring in the locked position with at least one supporting cam being arranged on the blocking ring at a distance from the radially outwardly pointing flange whose size exceeds the axial thickness of the annular projection by a dimension a.

This design of the locking mechanism incorporates an additional safety feature in that when the coupling sleeve is secured on the power takeoff shaft of a tractor and the agricultural implement attached, the locking mechanism cannot unintentionally move into the arrested open position. In order for this to occur, the flange pointing radially outwardly from the latching ring also must be moved in the direction of the arrested position by being moved by the dimension a toward the gripping sleeve.

In accordance with a further advantageous feature of the invention, the axial stop for the latching ring has been designed as a radially outwardly pointing supporting flange and the spring, at its other end, is supported on the supporting flange.

The advantage of this design is that, at the end facing away from the guide ring, the spring force is supported on the radially outwardly pointing flange associated with the latching ring. This means that the gripping sleeve can no longer be affected by any spring force so that when the drive shaft rotates and if the gripping sleeve is touched unintentionally, the latter is no longer subject to any frictional contact with the spring. As a result, the gripping sleeve is not subject to any dragging torque and if it is touched unintentionally, it is capable of stopping without any driving effect.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there is illustrated and described a preferred embodiment of the invention.

DETAILED DESCRIPTION OF THE PREFERRED EMBODIMENTS

Referring now to the drawings wherein like reference characters are used to refer to similar parts throughout the various figures thereof, a first embodiment of the present invention is shown in FIGS. 1-4. The device of the invention operates to enable a coupling sleeve 1 to be joined in torque transmitting engagement with a power takeoff shaft 10. The power takeoff shaft 10 may, of course, be the power takeoff shaft of a tractor or of some other agricultural implement. In the position shown in FIG. 1, the power takeoff shaft 10 and the coupling sleeve 1 are disengaged and the locking mechanism of the invention is arrested in the open position, as will be described more fully hereinafter.

A plurality of radial apertures 3 are formed in the coupling sleeve 1 and a plurality of engagement members 4 which may be in the form of spherical balls are radially movable within the apertures 3.

The locking mechanism of the invention comprises a locking ring member composed of a locking ring 2 and a gripping sleeve 5 connected therewith. The locking ring member 2, 5 is axially movable on the coupling sleeve 1 and is biased in a direction toward the right as viewed in FIG. 1 by a spring 8.

The mechanism also includes a guide ring or base ring 7 and latching means which are composed of a latching ring 9 having latching hooks 12 thereon. The latching means also comprise supporting brackets 6 which extend from the latching ring 9 into engagement with the locking ring 2.

A guide ring 7 is formed with apertures 17 therein through which the latching ring 9 and the supporting brackets 6 may extend. Furthermore, the locking mechanism of the invention is formed with first guide means which are interposed between the gripping sleeve 5 and the guide ring 7 and which, as seen in FIG. 2, may comprise splines or teeth 13 and 14 which, when the device is in the arrested open position shown in FIGS. 1 and 2, will engage with each other to maintain the gripping sleeve 5 axially movable, but nonrotatable relative to the coupling sleeve 1.

Figure 1:
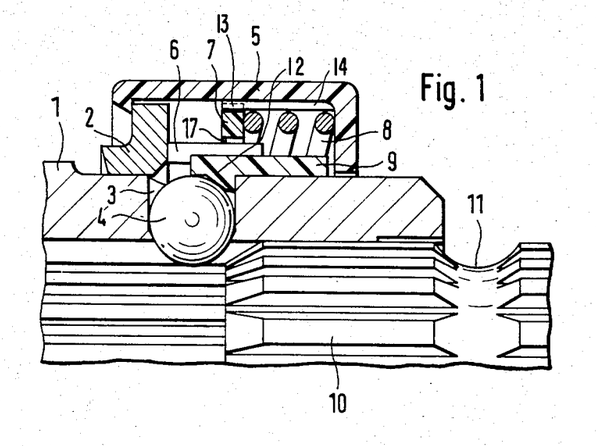
FIG. 1 is a longitudinal sectional view through a locking mechanism in accordance with the present invention shown in the arrested open position.

In the position shown in FIG. 1, the locking mechanism is held in the arrested open position and, in order to achieve this position, the gripping sleeve 5 has been pushed toward the left as shown in FIG. 1 against the force of the spring 8 a sufficient distance for the locking ring 2 to be moved away from the engagement members 4 so as to release the engagement members 4 so that they may move radially outwardly in the apertures 3. The arrested open position shown in FIG. 1 is maintained by the latching hooks 12 of the latching ring 9 which engage into the apertures 3 in the coupling sleeve 1, as shown in FIG. 1. The guide or base ring 7 is affixed onto the coupling sleeve 1 and when the latching ring 9 with the hooks 12 engages into the apertures 3 as shown in FIG. 1, the supporting brackets 6 will abut against the locking ring 2 and thereby arrest the locking ring 2 in the open position.

Figure 2:
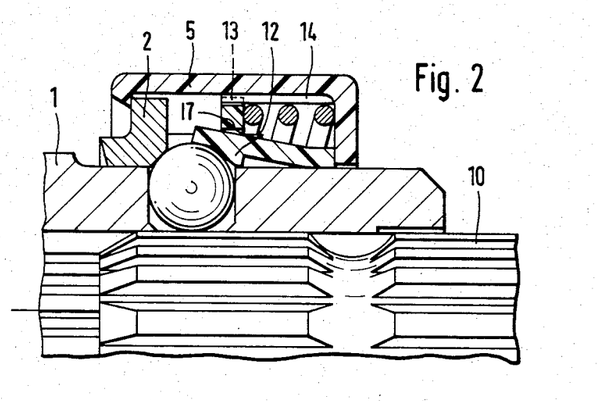
FIG. 2 is a longitudinal sectional view of the locking mechanism after the engagement members have stopped against the power takeoff shaft to which connection is to be made.

When the power takeoff shaft 10 is inserted into the coupling sleeve 1, the outer circumference of the shaft 10 will abut against the inner side of the engagement members 4 as is seen in FIG. 2. In FIG. 2, the position is shown wherein the coupling sleeve 1 has been slipped onto the power takeoff shaft far enough for the power takeoff shaft 10 to load the blocking members 4 toward the radially outer position in the apertures 3 in such a way that the latching hooks 12 will be lifted out of engagement in the apertures 3 in the coupling sleeve 1. It will be seen that the balls or engagement members 4 are engaged by the hooks 12 when the mechanism is in the arrested open position shown in FIG. 1 and that as the balls 4 move radially outwardly after being engaged by the shaft 10 they will push the hooks 12 upwardly so that the hooks will disengage from the apertures 3.

So long as the power takeoff shaft is in the position shown in FIG. 2, the locking ring 2 will abut against the balls 4 and will be pressed thereagainst by the force of the spring 8. However, when shaft 10 is further inserted into the coupling sleeve 1, so that the annular grooves 11 will be in axial alignment with the balls 4, then the balls 4 will drop into the annular groove 11 thereby releasing the locking ring 2 and the ring 2 will move to the position shown in FIG. 3 thereby holding the balls 4 in locking engagement within the annular groove 11 to hold the power takeoff shaft 10 and the coupling sleeve 1 in an axially locked position.

In this position, all radially acting forces acting on the engagement members 4 as a result of axial forces are exclusively accommodated by the locking ring 2. In the locked position, the latching hooks 12 are supported on the outer diameter of the coupling sleeve 1 as can be seen in FIG. 3.

As will be apparent from FIGS. 1 and 2, when the mechanism of the invention is in the open position, the teeth or splines 13 and 14 which are interposed between the guide ring 7 and the gripping sleeve 5 engage into each other so that the gripping sleeve 5 will be nonrotatively coupled with the coupling sleeve 1 by means of the guide ring 7 which is affixed to the sleeve 1. However, when the coupling sleeve 1 is slipped onto the power takeoff shaft 10 and the mechanism is brought into the locked position shown in FIG. 3, then the teeth 13, 14 are not in engagement with each other so that the gripping sleeve 5 may be rotated relative to the coupling sleeve 1.

Figure 3:
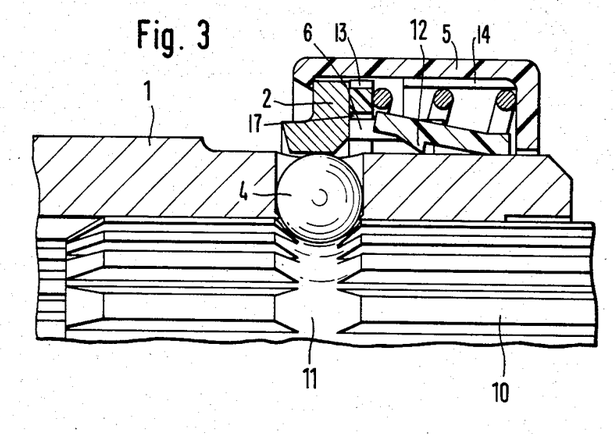
FIG. 3 is a longitudinal sectional view through the locking mechanism showing it in the locked position on the power takeoff shaft.
Figure 4:
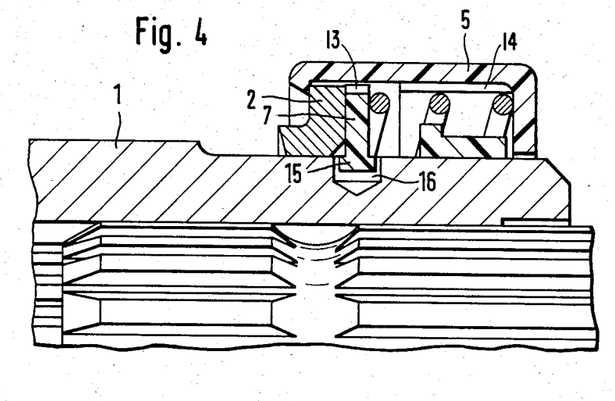
FIG. 4 is a longitudinal sectional view showing with greater clarity the attachment of the guide ring on the coupling sleeve.
Figure 5:
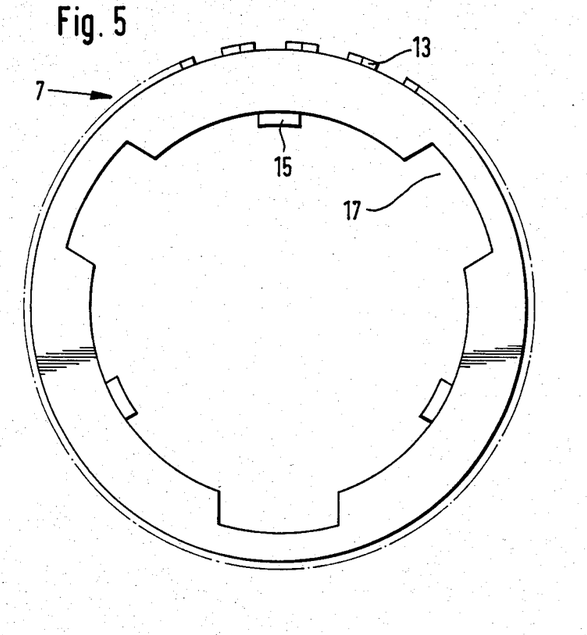
FIG. 5 is a plan view of the guide ring used in the embodiment of FIGS. 1-4.

FIG. 4 is an axial section taken along a radial plane other than the radial plane of FIGS. 1, 2 and 3 and depicts in particular the manner in which the guide ring 7 is engaged on the coupling sleeve 1. Furthermore, the guide ring 7 is shown more clearly in FIG. 5 wherein there is depicted the teeth 13 which engage with the teeth 14 of the sleeve 5, the apertures 17 through which the latching ring 9 and the supporting brackets 6 may extend as well as projections 15, three of which are provided on the radially inner side of the guide ring 7. As is clear from FIG. 4, the inwardly directed projections 15 engage into recesses 16 formed in the coupling sleeve 1.

Figure 6:
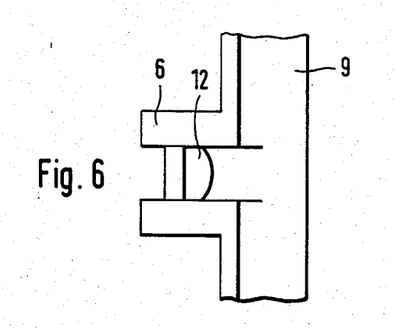
FIG. 6 is a plan view of part of the latching ring with two supporting brackets being shown together with a latching hook.

In FIG. 6, there is shown in somewhat greater detail parts of the latching ring 9. As will be apparent, the supporting brackets 6 project axially from the latching ring 9 and the latching hooks 12 are shown in FIG. 6 in their relative position taken together with the supporting brackets 6 in the latching ring 9.

Figure 7:
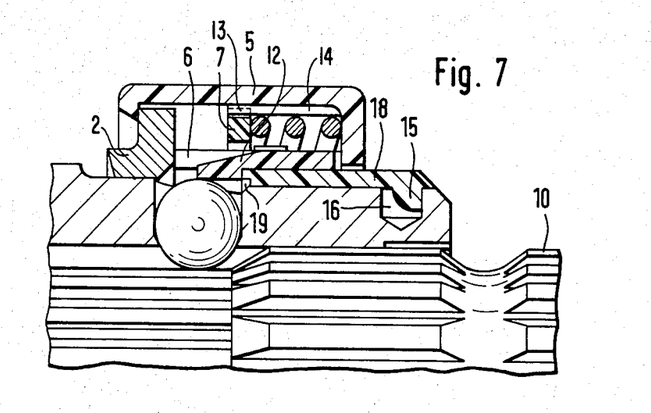
FIGS. 7 and 8 are both longitudinal sectional views showing a locking mechanism in accordance with a further embodiment of the invention with FIG. 7 showing the arrested open position and FIG. 8 showing the locked position wherein the guide ring is provided with a hollow cylindrical projection.
Figure 8:
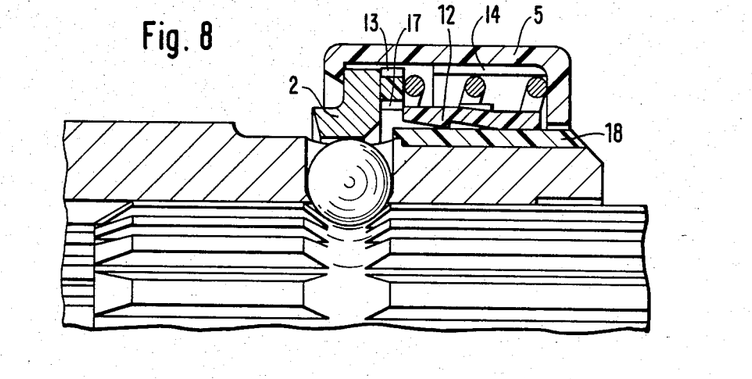
Figure 9:
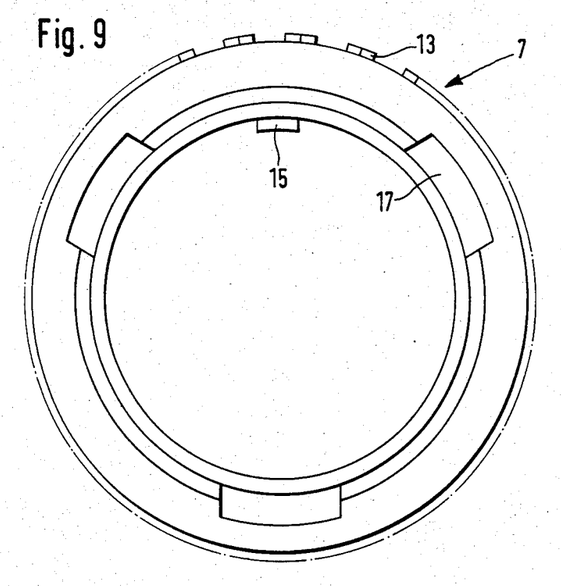
FIG. 9 is a plan view of the guide ring in accordance with the embodiment of FIGS. 7 and 8.

A further embodiment of the invention is shown in FIGS. 7-9. As will be noted from FIG. 9, which shows a plan view of the guide ring 7, the guide ring 7 is formed on the interior thereof with only one projection 15. Referring to FIGS. 7 and 8, it will be seen that the guide ring 7 has been provided with a cylindrical projection 18. Because of the resulting guiding length which is added to the guide ring 7 on the coupling sleeve 1 by the projection 18, only a single projection 15 extending radially inwardly is required in order to axially affix the guide ring 7 on the coupling sleeve 1. As a result, only a single recess 16 is required on the coupling sleeve for engagement therein by the projection 15. In FIG. 7, the locking mechanism of the invention is shown in the arrested open position and in FIG. 8, it is shown in the locked position. It should be understood that in FIG. 7, the projection is shown to be angularly offset relative to its actual position.

A counter stop is formed by a step 19 at the coupling sleeve 1.

Figure 10:
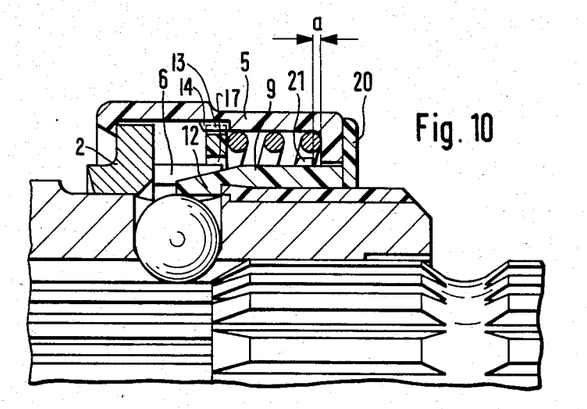
FIGS. 10 and 11 are longitudinal sectional views of a further embodiment of the invention wherein additional safety means against unintentional opening are provided, the locking mechanism being shown in FIG. 10 in the arrested open position and in FIG. 11 in the locked position.
Figure 11:
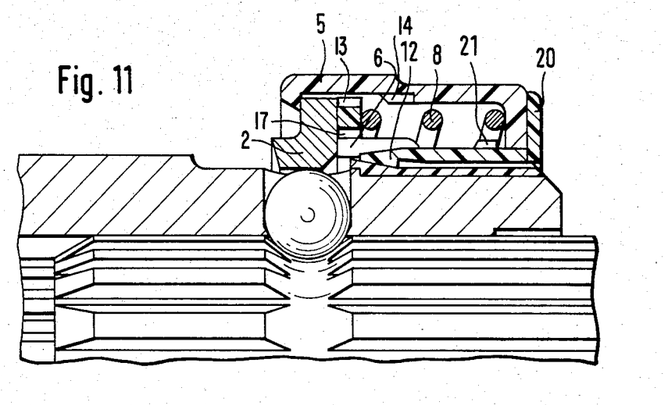

A further embodiment of the invention is shown in FIGS. 10 and 11 and, in FIG. 10, the locking mechanism is shown arrested in the open position. In the embodiment of FIGS. 10 and 11, the latching ring 9 is formed so as to extend through the gripping sleeve 5 which, at its rightmost end, is formed so as to extend about the end of the latching ring 9. Furthermore, the latching ring 9 is formed with a radially outwardly extending flange 20 on the end thereof and to the left of the end of the gripping sleeve 5, the latching ring 9 is provided with cams 21 which are equally circumferentially spaced thereabout. The cams 21 and the radial flange 20 form therebetween a gap which exceeds the axial thickness of the associated annular projection of the gripping sleeve 5 by a dimension a. This feature of the invention provides an additional safeguard against unintentional opening of the locking mechanism.

In particular, this additional safeguard serves to prevent the locking mechanism, when in the latched position on the power takeoff shaft, from being unintentionally changed from this position into the arrested open position. If, by mistake, the gripping sleeve 5 should be moved from the latched position into the open position, the latching ring 9 will remain behind the gripping sleeve 5 by the dimension a which is such that the latching hook 12 cannot drop behind the latching edge of the guide ring 7. Thus, the arrested open position of the mechanism shown in FIGS. 10 and 11 is achieved by actuating the radially outwardly extending flange 20 in order thereby to bring the latching hook 12 into latching engagement so as to bring the locking mechanism into the arrested open position.

Figure 12:
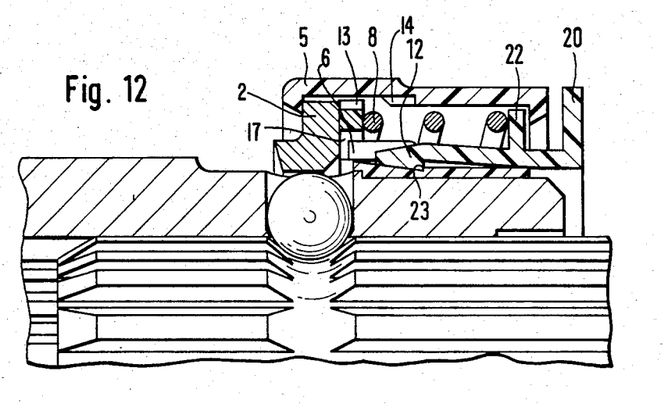
FIGS. 12-15 are each longitudinal sectional views of a further embodiment of the invention shown in each of the figures in different functional positions and held in the locked position so as to be free of dragging torque.

FIG. 12 shows a modification of the locking mechanism of the invention and, in FIG. 12, there is provided a supporting flange 22 on the latching ring 9. The end of the spring member 8 opposite the end which engages against the guide ring 7 is therefore supported against the supporting flange 22. The guide ring 7 is provided with stops 23 upon which the latching hooks 12 are supported in the locked position of the locking mechanism shown in FIG. 12. The advantage of the design of FIG. 12 is that in the locked position the gripping sleeve 5 can move in a completely force-free manner since it no longer forms a frictional locking connection with the spring 8.

Furthermore, it will again be seen that the supporting flange 22 is located so that the spacing between the flange 22 and the radial flange 20 on the latching ring 9 will exceed the thickness of the radially inwardly pointing flange end of the gripping sleeve 5 by the dimension a.

Furthermore, as will be noted from FIG. 12, the radially inwardly directed flange end of the gripping sleeve 5 is provided with an opening which, as compared to the embodiment shown in FIGS. 10 and 11, has a greater diameter whereby the latching ring 9 may be inserted into the gripping sleeve 5 with ease. It will be noted from FIG. 12, furthermore, that the ends of the inwardly directed flange of the gripping sleeve 5 which define the opening are formed with an outwardly tapering con- figuration.

Figure 13:
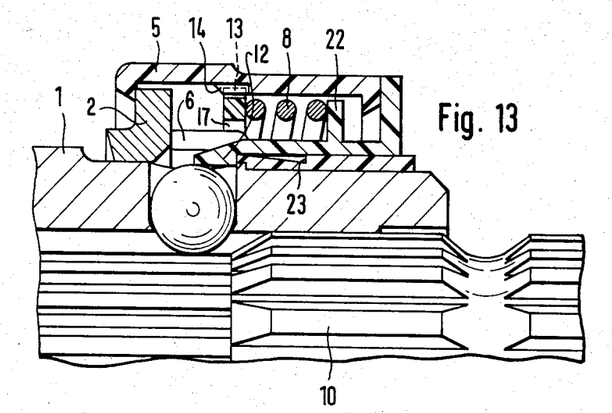

In FIG. 13, there is shown a further embodiment of the invention wherein the teeth 13 of the guide ring 7 and the teeth 14 of the gripping sleeve 5 are engaged with each other with the locking mechanism shown arrested in the open position, as indicated, the teeth 13 and 14 extending axially as shown. With the teeth 13 and 14 engaged, the coupling sleeve 1 may be turned through the gripping sleeve 5 for the purpose of attaching it to the splined profile of the power takeoff shaft.

Figure 14:
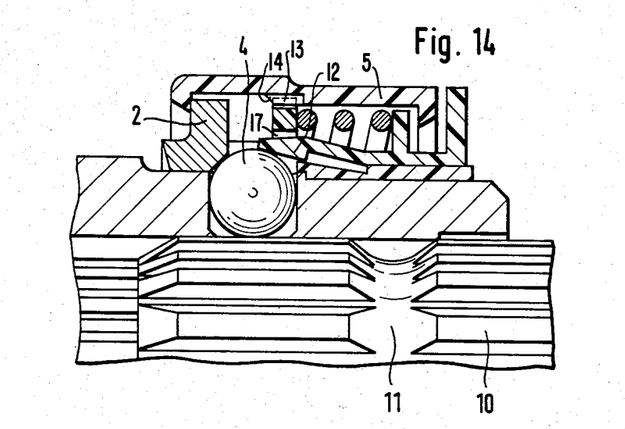

In FIG. 14, the locking mechanism in accordance with the invention is shown as having been slipped onto the power takeoff shaft 10. The locking mechanism is in a tensioned condition so that the engagement members, when reaching the circular groove 11, may engage into the groove and they are then embraced by the locking ring 2 for locking purposes.

Figure 15:
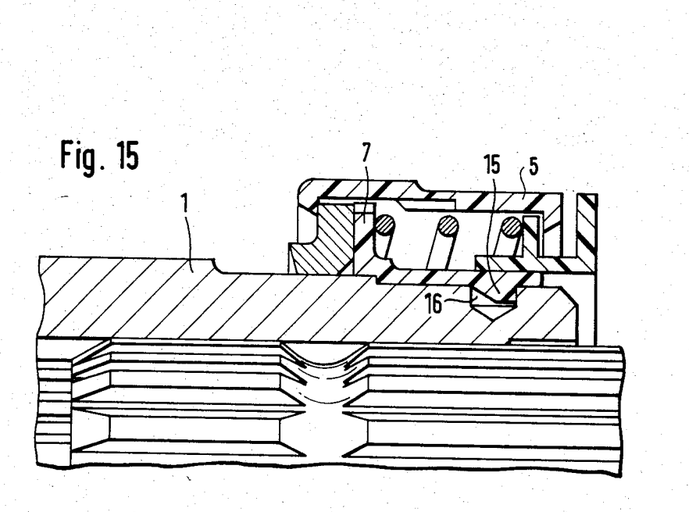

FIG. 15 shows the attachment of the guide ring 7 on the coupling sleeve 1. With its projection 15 provided at its inner cylindrical face, the guide ring 7 points into the recess 16 of the coupling sleeve 1 which secures the guide ring 7 on the coupling sleeve 1 against rotation and axial movement.

Figure 16:
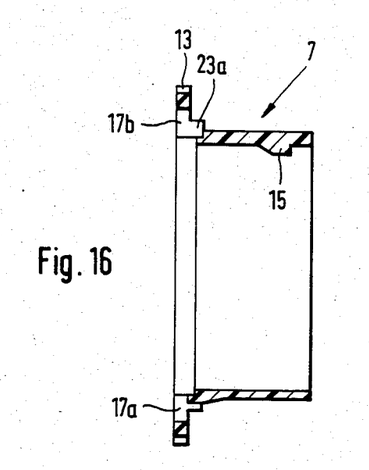
FIG. 16 is a sectional view showing a guide ring in accordance with the invention.
Figure 17:
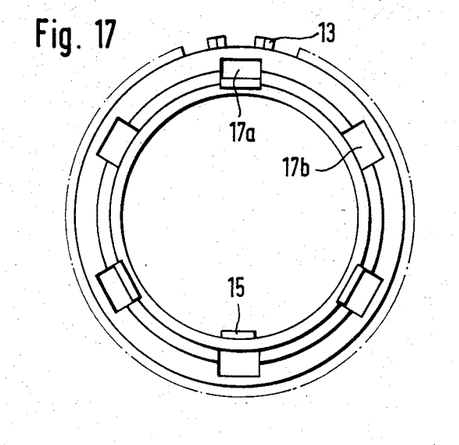
FIG. 17 is a plan view showing a guide ring in accordance with the present invention having a modified design.
Figure 18:
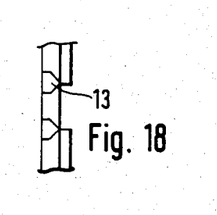
FIG. 18 is a partial view of the guide ring in accordance with the invention particularly depicting a pointed tooth thereof.
Figure 19:
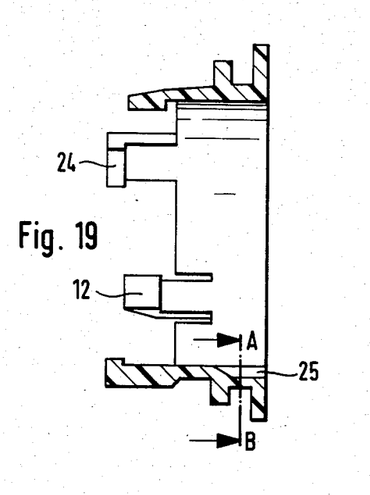
FIG. 19 is a sectional view through a modified version of a latching ring in accordance with the invention.

In FIGS. 16–18, the guide ring 7 is shown as having been provided with separate apertures 17a for the latching hooks 12 and 17b for the supporting brackets 6. In the region of the apertures 17b, provision is made for a stop 23a which cooperates with counter hooks 24 at the supporting brackets 6 (FIGS. 16 and 19). In this embodiment, the latching ring 9, by means of the counter hooks 24 in connection with the stops 23a, is held in the latched position for receiving the force of the spring 8.

FIG. 19 shows a cross-sectional view of a latching ring which has been provided with supporting brackets 6 and which includes a counter hook 24 and in the case of which the supporting brackets 6 and the latching hooks 12 are arranged alternately so as to be uniformly distributed around the circumference.

Figure 20:
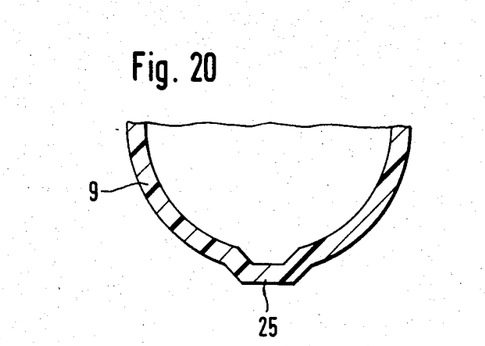
FIG. 20 is a sectional view taken along the line A-B of FIG. 19.

FIG. 20 shows a sectional view taken through the latching ring 9 which has been provided with a bead 25 permitting the projection 15 of the guide ring 7 to be pushed through for the purpose of slipping the guide ring 7 on the coupling sleeve 1.

Figure 21:
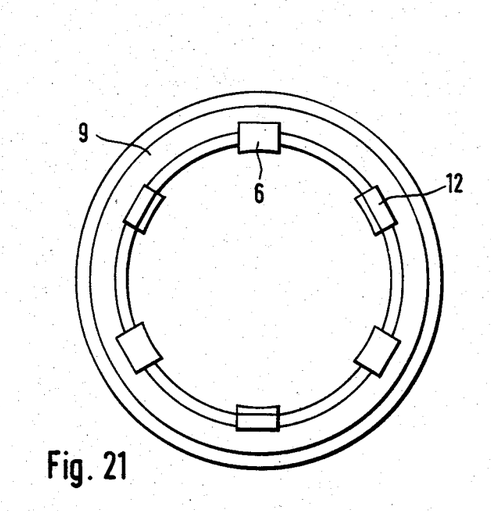
FIG. 21 is a plan view showing a modified version of a latching ring in accordance with the invention.

FIG. 21 is a plan view of the latching ring 9 showing the supporting brackets 6 and the latching hooks 12.

Figures 22, 23:
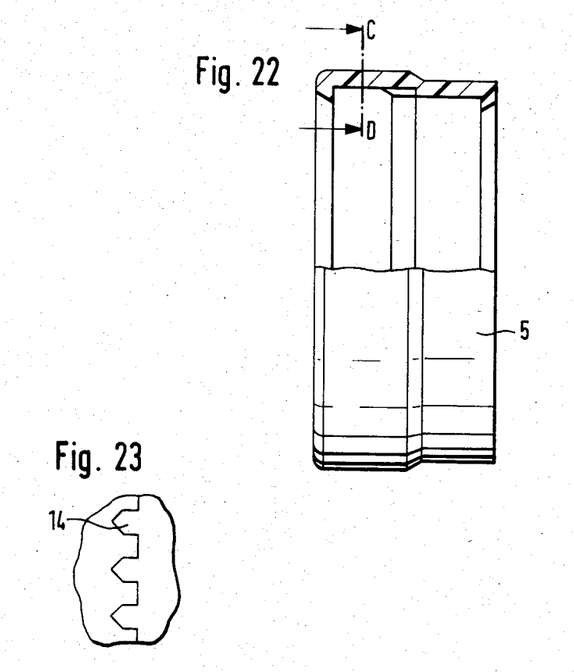
FIG. 22 is a partial sectional view showing a gripping sleeve of the locking ring member of the invention.
FIG. 23 is a plan view showing the pointed teeth of the gripping sleeve.

FIG. 22 represents a partial sectional view taken through the gripping sleeve 5 including associated teeth 14, the details of which are shown in FIG. 23.

Figure 24:
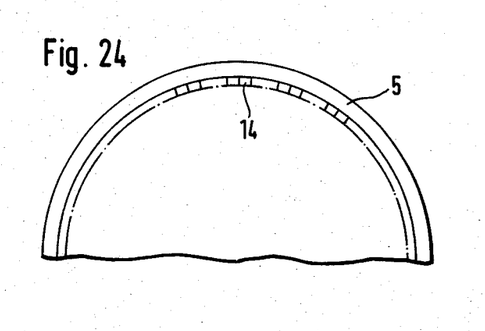
FIG. 24 is a partial sectional view taken along the line C-D of FIG. 22.

FIG. 24 is a sectional view taken along the line C–D in FIG. 22 through the gripping sleeve as well as a plan view of the pointed teeth 14.

Thus, in accordance with the foregoing, it will be seen that the present invention is directed towards providing a locking mechanism for a driveline coupling which may be arrested in the open position and which may also be attached subsequently in the form of a slip-on unit to a coupling sleeve for a drive shaft and which, in the open position, permits the coupling sleeve to be turned by means of the coupling sleeve 5 of the locking mechanism.

The objectives of the invention are achieved in that the guide ring is formed as a flange-like unit with axially extending apertures and is held on the coupling sleeve so as to be nonrotative and axially fixed therewith. The latching ring 9 passes through the apertures in the guide ring 7 with the supporting brackets resting axially against the locking ring 2. The latching hooks extend in the same direction as the supporting brackets and they are guided on the coupling sleeve so as to be axially movable. The locking ring is spring-loaded, by means of the gripping sleeve 5, in the direction of the locking position of the locking mechanism and the cylindrical interface of the gripping sleeve is provided with teeth, which, in the open position of the locking mechanism, engage with complementary teeth in the guide ring.

While a specific embodiment of the invention has been shown and described in detail to illustrate the application of the inventive principles, it will be understood that the invention may be embodied otherwise without departing from such principles.

What is claimed is:

1. A driveline coupling mechanism with a safety interlock device particularly suitable for connecting the drive shaft of an agricultural implement with the power takeoff shaft of a tractor, comprising:

a coupling sleeve having radial apertures therein;

a drive shaft configured to enable it to be held in torque transmitting engagement with said coupling sleeve having an annular groove formed therein;

engagement members located within said radial apertures and radially movable therein for engagement within said annular groove to axially hold said coupling and said shaft together;

a locking ring member axially movable on said coupling sleeve between a locking position, for locking said engagement members in engagement within said annular groove and an unlocking position, permitting said engagement members to move radially upwardly for disengagement from said annular groove;

spring means axially biasing said locking ring member toward said locking position;

latching means engaging within said radial apertures in a latched position and structured to abut said locking ring member for holding said locking ring member in said unlocking position, said latching means being engaged by said engagement members and being brought to an unlatched position to permit said locking ring member to move to said locking position when said drive shaft is inserted into said coupling sleeve;

a guide ring affixed to said coupling sleeve; and guide means interposed between said guide ring and said locking ring member for enabling relative axial movement between said locking ring member and said coupling sleeve while preventing relative rotative movement therebetween when said locking ring means is in said unlocking position.

2. A mechanism according to claim 1, wherein said locking ring member comprises a locking ring adapted to be engaged circumferentially about said engagement members and gripping sleeve extending axially from said locking ring, said gripping sleeve having applied the spring biasing force of said spring means.

3. A mechanism according to claim 2, wherein said guide ring includes an outer circumference wherein said guide means comprise teeth provided on said outer circumference of said guide ring and corresponding teeth provided on said gripping sleeve with both sets of said teeth at the ends facing each other being pointed with both sets of teeth, in the unlocked position of said locking ring member, entering into operative connection.

4. A mechanism according to claim 1, wherein said guide ring is provided with a hollow cylindrical projection extending toward the direction from which said drive shaft is brought into engagement with said coupling sleeve for the purpose of guiding said latching means.

5. A mechanism according to claim 2, wherein said latching means is formed with a pair of radially projecting members defining a space therebetween, wherein said gripping sleeve includes a radially inwardly directed part thereof extending to between said radially projecting members of said latching means and wherein the space between said radially projecting members is greater than the thickness of said radially inwardly directed part of said gripping sleeve.

6. A mechanism according to claim 5, wherein when said gripping sleeve and said locking ring are moved to the unlocking position of said locking ring member, said latching means are spaced from the latched position by a distance corresponding to the difference between the spacing between said radially projecting members and the thickness of said radially inwardly directed part of said gripping sleeve, with said latching means being brought into said latched position by application of a latching force to one of said radially projecting members thereof.

7. A mechanism according to claim 6, wherein said guide ring is provided with at least one projection designed as a radial stop for said latching means.

8. A mechanism according to claim 2, wherein said spring means is interposed between said gripping sleeve and said guide ring.

9. A mechanism according to claim 2, wherein said spring means is interposed between said guide ring and said latching means.

10. A mechanism according to claim 5, wherein said spring means is interposed between said guide ring and one of said radially projecting members of said latching means.

11. A mechanism according to claim 1, wherein said latching means comprises a latching ring having at least one latching hook thereon which is adapted to engage within said apertures of said coupling sleeve and at least one supporting bracket formed integrally therewith which extends through said guide ring into abutting engagement with said locking ring member.

12. A mechanism according to claim 1, wherein said coupling sleeve includes recesses therein and wherein said guide ring is formed with projections engaging into said recesses to hold said guide ring on said coupling sleeve.

* * * * *